(12) United States Patent
Yang et al.

(10) Patent No.: US 11,761,827 B2
(45) Date of Patent: Sep. 19, 2023

(54) FIBER OPTIC TEMPERATURE SENSOR AND SENSING HEAD STRUCTURE

(71) Applicant: GUANGDONG OCEAN UNIVERSITY, Zhanjiang (CN)

(72) Inventors: Yuqiang Yang, Zhanjiang (CN); Xiaoguang Mu, Zhanjiang (CN); Ji Wang, Zhanjiang (CN); Mingxin Liu, Zhanjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 17/910,520

(22) PCT Filed: Mar. 23, 2022

(86) PCT No.: PCT/CN2022/082610
§ 371 (c)(1),
(2) Date: Sep. 9, 2022

(87) PCT Pub. No.: WO2022/199637
PCT Pub. Date: Sep. 29, 2022

(65) Prior Publication Data
US 2023/0184596 A1 Jun. 15, 2023

(30) Foreign Application Priority Data
Mar. 23, 2021 (CN) .......................... 202110310914.8

(51) Int. Cl.
*G01K 11/32* (2021.01)
*G02B 6/024* (2006.01)
(Continued)

(52) U.S. Cl.
CPC .............. *G01K 11/32* (2013.01); *G02B 6/024* (2013.01); *G02B 6/266* (2013.01);
(Continued)

(58) Field of Classification Search
CPC ........ G01K 11/32; G02B 6/024; G02B 6/266; G02B 2006/12157
See application file for complete search history.

(56) References Cited

U.S. PATENT DOCUMENTS

2007/0258087 A1  11/2007  Ogura et al.

FOREIGN PATENT DOCUMENTS

CN  105716755 A  6/2016
CN  107796530 A  3/2018
(Continued)

*Primary Examiner* — Brandi N Hopkins
*Assistant Examiner* — Janice M Soto
(74) *Attorney, Agent, or Firm* — Bayramoglu Law Offices LLC

(57) ABSTRACT

A fiber optic temperature sensor, a sensing head structure, and a manufacturing method are provided. The fiber optic temperature sensor includes a broad spectrum light source, a first fiber optic coupler, a spectrometer, a first sensing interferometer, and a second sensing interferometer. The first sensing interferometer and the second sensing interferometer have opposite temperature responses. A first free spectral range corresponding to the first sensing interferometer is close to but not equal to a second free spectral range corresponding to the second sensing interferometer. In the fiber optic temperature sensor, two sensing interferometers both sensitive to temperature are used, and the two sensing interferometers have opposite temperature responses, thereby achieving an enhanced vernier effect, and improving the sensitivity of temperature measurement.

2 Claims, 4 Drawing Sheets

(51) Int. Cl.
G02B 6/26 (2006.01)
G02B 6/293 (2006.01)
G02B 6/12 (2006.01)

(52) U.S. Cl.
CPC ..... *G02B 6/29347* (2013.01); *G02B 6/29359* (2013.01); *G02B 2006/12157* (2013.01)

(56) References Cited

FOREIGN PATENT DOCUMENTS

| CN | 107817062 A | * | 3/2018 | ............ G01K 11/32 |
| --- | --- | --- | --- | --- |
| CN | 107817062 A | | 3/2018 | |
| CN | 109507134 A | | 3/2019 | |
| CN | 110057438 A | | 7/2019 | |
| CN | 111337060 A | | 6/2020 | |
| CN | 113074830 A | | 7/2021 | |

* cited by examiner

FIBER OPTIC TEMPERATURE SENSOR AND SENSING HEAD STRUCTURE

CROSS REFERENCE TO THE RELATED APPLICATIONS

This application is the national phase entry of International Application No. PCT/CN2022/082610, filed on Mar. 23, 2022, which is based upon and claims priority to Chinese Patent Application No. 202110310914.8, filed on Mar. 23, 2021, the entire contents of which are incorporated herein by reference.

TECHNICAL FIELD

Implementations of the present disclosure relate to the field of fiber optic sensing, and in particular, to a fiber optic temperature sensor, a sensing head structure, and a manufacturing method.

BACKGROUND

As temperature is one of the seven basic physical quantities of the International System of Units, accurate measurement of temperature plays an important role in the fields of national economy, national defense construction, scientific research, etc. With the increasing demand for temperature sensing applications, traditional temperature sensors have been unable to meet high-accuracy measurement requirements. Fiber optic temperature sensors have many advantages, such as small size, high measurement accuracy, high sensitivity, strong anti-electromagnetic interference, and good electrical insulation, and have their own unique advantages in temperature measurement.

SUMMARY

In the context herein, implementations of the present disclosure are intended to provide a fiber optic temperature sensor, a sensing head structure, and a manufacturing method, to further improve the sensitivity of temperature measurement of the fiber optic temperature sensor.

According to a first aspect of the implementations of the present disclosure, a fiber optic temperature sensor is provided. The fiber optic temperature sensor includes a broad spectrum light source, a first fiber optic coupler, a spectrometer, a first sensing interferometer, and a second sensing interferometer. The first sensing interferometer and the second sensing interferometer have opposite temperature responses; and a first free spectral range corresponding to the first sensing interferometer is close to but not equal to a second free spectral range corresponding to the second sensing interferometer.

Furthermore, in the fiber optic temperature sensor, the first sensing interferometer is a Sagnac interferometer including a second fiber optic coupler and a polarizing optical fiber; and the second sensing interferometer is an F-P interferometer formed by connecting a single-mode optical fiber and a polydimethylsiloxane (PDMS) cavity.

Furthermore, the fiber optic temperature sensor further includes a fiber optic isolator and an attenuator. Incident light outputted by the broad spectrum light source is divided into two paths after successively passing through the fiber optic isolator and the first fiber optic coupler, where one path enters the Sagnac interferometer, and the other path enters the F-P interferometer through the attenuator. A result of superimposing an interference spectrum returned by the Sagnac interferometer and an interference spectrum returned by the F-P interferometer is obtained by the spectrometer. A first terminal of the second fiber optic coupler is connected to the first fiber optic coupler, and the polarizing optical fiber is connected between a second terminal and a third terminal of the second fiber optic coupler. The incident light entering the Sagnac interferometer is divided in the polarizing optical fiber into two light beams having polarization directions perpendicular to each other, interference occurs between the two light beams after passing through the polarizing optical fiber, and obtained interference light is outputted from the first terminal of the second fiber optic coupler and then received by the spectrometer through the first fiber optic coupler. A part of the incident light entering the F-P interferometer is reflected back to the single-mode optical fiber at an interface between the single-mode optical fiber and the PDMS cavity, and another part of the incident light is transmitted to enter the PDMS cavity and then partially reflected back to the single-mode optical fiber at an interface between the PDMS cavity and air, and is interfered with the part of the incident light reflected back to the single-mode optical fiber at the interface between the single-mode optical fiber and the PDMS cavity. A length of the polarizing optical fiber and an axial length of the PDMS cavity are set as: making the first free spectral range of the Sagnac interferometer close to but not equal to the second free spectral range of the F-P interferometer.

Furthermore, the fiber optic temperature sensor has a temperature sensitivity $S_{12}$ as follows:

$$S_{12} = M(S_2 - S_1) = \begin{cases} M'_1 S_1 \\ M'_2 S_2 \end{cases};$$

where $\begin{cases} |M'_1| = \left|\left[1 - \frac{B(\alpha + n\beta)}{\Delta B}\right]M\right| > |M| \\ |M'_2| = \left|\left[1 - \frac{\Delta B}{B(\alpha + n\beta)}\right]M\right| > |M| \end{cases}$;

M is an amplification factor of a conventional vernier effect; $S_1$ represents a temperature sensitivity of the Sagnac interferometer, where $$S_1 = \frac{\Delta B}{B},$$

B represents a birefringence coefficient, $\Delta B$ represents a change in refractive index of the polarizing optical fiber when the temperature increases by 1° C., and $\Delta B<0$; $S_2$ represents a temperature sensitivity of the F-P interferometer, where $$S_2 = \frac{\lambda_m}{n}(\alpha + n\beta),$$

$\alpha$ represents a thermo-optical coefficient of PDMS, $\lambda_m$ represents a peak wavelength of an interference spectrum, n represents a refractive index of the PDMS, and $\beta$ is a thermal expansion coefficient of the PDMS.

Furthermore, the PDMS cavity is a PDMS-filled quartz tube or a PDMS-filled hollow-core optical fiber.

Furthermore, the single-mode optical fiber is provided with one end connected to the attenuator and the other end welded to one end of the quartz tube or the hollow-core optical fiber.

Furthermore, the first free spectral range is close to but not equal to the second free spectral range, specifically: a ratio of a difference between the first free spectral range and the second free spectral range to a union of the first free spectral range and the second free spectral range is greater than a first preset value and less than a second preset value.

Furthermore, the first preset value is 1%; and the second preset value is 10%.

According to a second aspect of the present disclosure, a sensing head structure for a fiber optic temperature sensor is also provided. The sensing head structure includes a first sensing interferometer and a second sensing interferometer. The first sensing interferometer and the second sensing interferometer have opposite temperature responses; and a first free spectral range corresponding to the first sensing interferometer is close to but not equal to a second free spectral range corresponding to the second sensing interferometer.

Furthermore, the first sensing interferometer includes a Sagnac interferometer including a second fiber optic coupler and a polarizing optical fiber; and the second sensing interferometer includes an F-P interferometer formed by connecting a single-mode optical fiber and a PDMS cavity.

Furthermore, a result of superimposing an interference spectrum returned by the Sagnac interferometer and an interference spectrum returned by the F-P interferometer is obtained by a spectrometer of the fiber optic temperature sensor. A first terminal of the second fiber optic coupler is connected to a first fiber optic coupler of the fiber optic temperature sensor, and the polarizing optical fiber is connected between a second terminal and a third terminal of the second fiber optic coupler. A length of the polarizing optical fiber and an axial length of the PDMS cavity are set as: making the first free spectral range of the Sagnac interferometer close to but not equal to the second free spectral range of the F-P interferometer.

Furthermore, the PDMS cavity is a PDMS-filled quartz tube or a PDMS-filled hollow-core optical fiber.

Furthermore, the single-mode optical fiber is provided with one end connected to the attenuator and the other end welded to one end of the quartz tube or the hollow-core optical fiber.

Furthermore, the first free spectral range is close to but not equal to the second free spectral range, specifically: a ratio of a difference between the first free spectral range and the second free spectral range to a union of the first free spectral range and the second free spectral range is greater than a first preset value and less than a second preset value.

Furthermore, the first preset value is 1%; and the second preset value is 10%.

According to a third aspect of the present disclosure, a manufacturing method for a sensing head structure of a temperature sensor based on cascading of an optical fiber Sagnac interferometer and a PDMS cavity F-P interferometer is also provided. The manufacturing method includes: taking a section of polarizing optical fiber having a length as a first predetermined length; connecting a second terminal of a second fiber optic coupler to one end of the section of polarizing optical fiber, and connecting a third terminal of the second fiber optic coupler to the other end of the section of polarizing optical fiber, so that the second fiber optic coupler and the polarizing optical fiber connected to each other form an Sagnac interferometer; welding one end of a single-mode optical fiber to one end of a hollow-core optical fiber or quartz tube; cutting the other end of the hollow-core optical fiber or quartz tube, so that a length of the cut hollow-core optical fiber or quartz tube is a second predetermined length; and fully injecting PDMS into a cavity of the hollow-core optical fiber or quartz tube, and making the injected PDMS have no bubble inside, then heating to cure the injected PDMS to form a PDMS cavity, where the first predetermined length and the second predetermined length satisfy: making the first free spectral range of the Sagnac interferometer close to but not equal to the second free spectral range of the F-P interferometer.

Furthermore, the first free spectral range is close to but not equal to the second free spectral range, specifically: a ratio of a difference between the first free spectral range and the second free spectral range to a union of the first free spectral range and the second free spectral range is greater than a first preset value and less than a second preset value.

Furthermore, the first preset value is 1%; and the second preset value is 10%.

In the fiber optic temperature sensor, the sensing head structure, and the manufacturing method according to the implementations of the present disclosure, by cascading the first sensing interferometer and the second sensing interferometer, the free spectral ranges of the two are close but not equal, so that interference spectra of parallel double cavities of the first sensing interferometer and the second sensing interferometer produce an envelope. In the conventional vernier effect, a reference interferometer not sensitive to measured parameters and a sensing interferometer sensitive to external parameters are used. However, in embodiments of the present disclosure, two sensing interferometers both sensitive to temperature are used, and the two sensing interferometers have opposite temperature responses, thereby achieving an enhanced vernier effect, and improving the sensitivity of temperature measurement compared with the prior art.

In some embodiments, a high-sensitivity temperature sensor that cascades a fiber optic Sagnac ring (Sagnac interferometer) and a fiber optic PDMS cavity (Fabry-Perot interferometer) can be provided. Since the Sagnac ring and the PDMS cavity have opposite temperature responses, by designing free spectral ranges for the Sagnac ring and the PDMS cavity, the free spectral range of the optical fiber Sagnac ring and the free spectral range of the optical fiber PDMS cavity in the sensor can be close but not equal, thereby achieving the enhanced vernier effect, and greatly improving the sensitivity of temperature measurement.

BRIEF DESCRIPTION OF THE DRAWINGS

The present disclosure may be better understood by reference to the following description taken in conjunction with the accompanying drawings, where the same or like reference numerals are used throughout the drawings to refer to the same or like parts. The accompanying drawings, together with the following detailed description, are incorporated in and form a part of this specification, and are used to further illustrate the preferred embodiments of the present disclosure and to explain the principles and advantages of the present disclosure.

Figure 1:
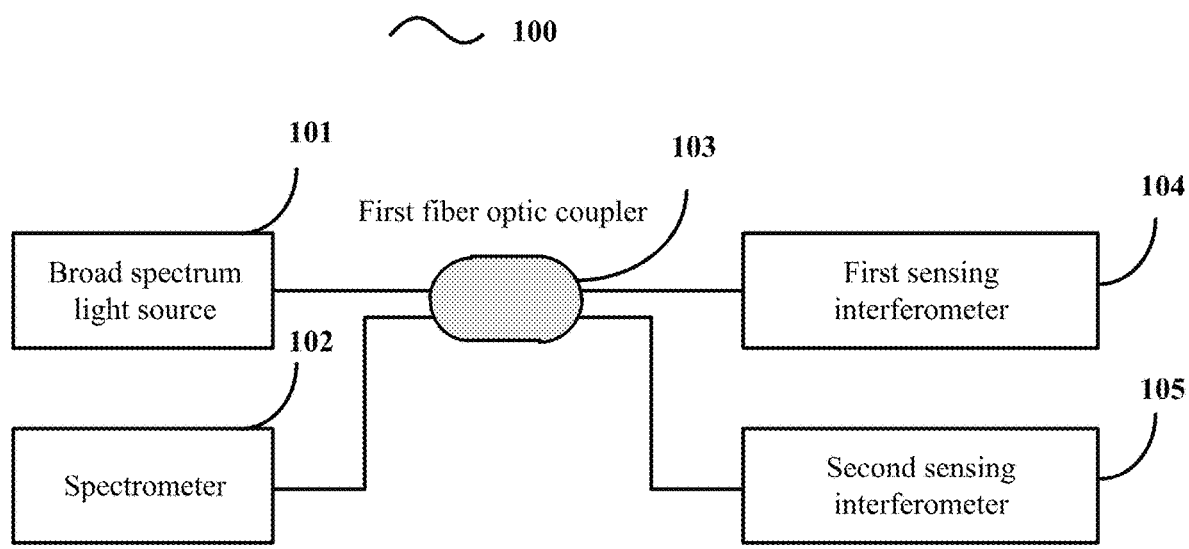
FIG. 1 is a schematic structure diagram illustrating an example of a fiber optic temperature sensor according to one embodiment of the present disclosure.

Those skilled in the art should understand that elements in the accompanying drawings are illustrated for simplicity and clarity only and have not necessarily been drawn to scale. For example, the dimensions of some of the elements in the accompanying drawings may be exaggerated relative to other elements to help to improve understanding of embodiments of the present disclosure.

DETAILED DESCRIPTION OF THE EMBODIMENTS

The exemplary embodiments of the present disclosure will be described below with reference to the accompanying drawings. For simplicity and clarity, not all features of an actual implementation are described in the specification. However, it should be understood that many implementation-specific decisions must be made in the development of any such practical embodiment in order to achieve the developer's specific goals, such as compliance with those constraints associated with the system and business, and these restrictions may vary from implementation to implementation. Furthermore, it should also be understood that, while development work may be very complex and time consuming, such development work would be a routine undertaking for those skilled in the art having the benefit of the present disclosure.

Here, it should also be noted that, to avoid obscuring the present disclosure due to unnecessary details, only the device structure and/or processing steps closely related to the solution according to the present disclosure are shown in the accompanying drawings, and other details not greatly related to the present disclosure are omitted.

The inventors found that, in the conventional vernier effect, fiber optic temperature sensing is implemented by cascading a reference interferometer that is not sensitive to measured parameters and a sensing interferometer that is sensitive to external parameters.

If the sensitivity of temperature measurement can be further improved, the performance of the fiber optic temperature sensor will be further improved.

The inventors found that by using two sensing interferometers having opposite temperature responses, an enhanced vernier effect can be achieved, so that the sensitivity of temperature measurement can be further improved.

In addition, the inventors also found that PDMS is an excellent thermosensitive material, which has a strong effect of thermal expansion and cold contraction under the action of temperature. After solidification, the PDMS is a colorless and transparent solid having good light transmission and refractivity. In addition, the PDMS also has good adhesion and chemical inertness. Therefore, the PDMS is very suitable for combination with an optical fiber and can be used for high-sensitivity temperature measurement.

Some embodiments of the present disclosure are respectively described below.

Example Device 1

One embodiment of the present disclosure provides a fiber optic temperature sensor. The fiber optic temperature sensor includes a broad spectrum light source, a first fiber optic coupler, a spectrometer, a first sensing interferometer, and a second sensing interferometer. The first sensing interferometer and the second sensing interferometer have opposite temperature responses; and a first free spectral range corresponding to the first sensing interferometer is close to but not equal to a second free spectral range corresponding to the second sensing interferometer.

An example of the fiber optic temperature sensor of the present disclosure is described below.

FIG. 1 shows an exemplary structure of the fiber optic temperature sensor 100.

As shown in FIG. 1, the fiber optic temperature sensor 100 includes a broad spectrum light source 101, a spectrometer 102, a first fiber optic coupler 103, a first sensing interferometer 104, and a second sensing interferometer 105.

The first sensing interferometer 104 and the second sensing interferometer 105 have opposite temperature responses.

A first free spectral range corresponding to the first sensing interferometer 104 is close to but not equal to a second free spectral range corresponding to the second sensing interferometer 105.

As an example, if FSR1 represents the first free spectral range of the first sensing interferometer 104, and FSR2 represents the second free spectral range of the second sensing interferometer 105, the first free spectral range is close to but not equal to the second free spectral range, specifically, for example: a ratio of a difference between FSR1 and FSR2 to a union of FSR1 and FSR2 is greater than a first preset value and less than a second preset value.

The first preset value may be, for example, 0, or may be 1%, or may be other preset values. The second preset value may be, for example, 10%, or may be 9%, or may be other preset values.

For example, FSR1 may be 0.90-0.99 of FSR2, and in this case, it can be understood that FSR2 covers FSR1, FSR1 is the part of 90%-99% of FSR2, and FSR1 does not contain the other 10%-1% of FSR2. In other words, FSR2 covers FSR1, and the width of FSR1 is about 0.90-0.99 times the width of FSR2.

For another example, FSR1 may also be 1.01-1.10 of FSR2, and in this case, it can be understood that FSR1 covers FSR2, and FSR1 is 101%-110% of FSR2. That is to say, in a spectrum contained in FSR1, in addition to including all the spectra of FSR2, an additional part of the spectral range is included, and the width of the additional part may account for 1%-10% of the width of FSR2. In other words, FSR1 covers FSR2, and the width of FSR1 is 1.01-1.10 times the width of FSR2.

Or, FSR1 and FSR2 may also be in a partially overlapping relationship, and a proportion of the overlapping part in the union of FSR1 and FSR2 may be, for example, 1%-10%.

It should be noted that both the first and second preset values can be set according to an experience point, or can also be determined by an experimental method.

Therefore, in practical applications, when the fiber optic temperature sensor according to one embodiment of the present disclosure is configured to perform temperature sensing measurement, by cascading (in parallel) the first sensing interferometer 104 and the second sensing interferometer 105, the free spectral ranges of the two are close but not equal, so that interference spectra of parallel double cavities of the first sensing interferometer 104 and the second sensing interferometer 105 produce an envelope.

In the conventional vernier effect, a reference interferometer not sensitive to measured parameters and a sensing interferometer sensitive to external parameters are used. However, in embodiments of the present disclosure, two sensing interferometers both sensitive to temperature are used, and the two sensing interferometers have opposite temperature responses, thereby achieving an enhanced vernier effect, and improving the sensitivity of temperature measurement compared with the prior art.

Figure 2A:
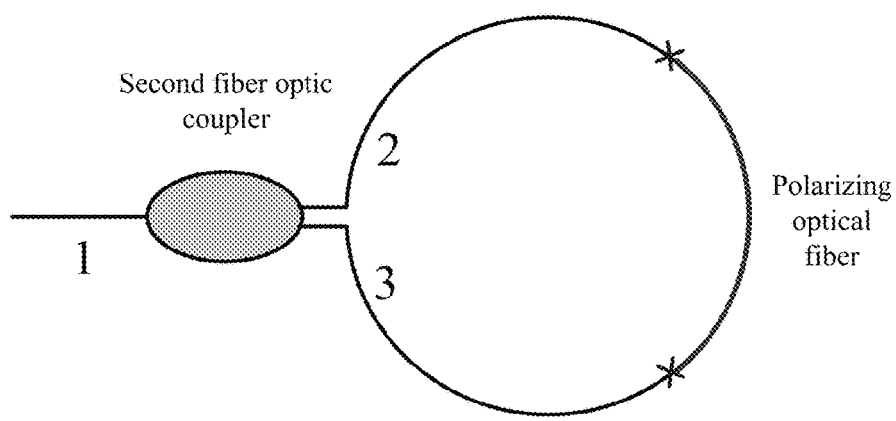
FIG. 2A is a schematic structural diagram illustrating a Sagnac interferometer including a second fiber optic coupler and a polarizing optical fiber used in one embodiment of the present disclosure.

As an example, the first sensing interferometer may be, for example, a Sagnac interferometer including a second fiber optic coupler and a polarizing optical fiber, as shown in FIG. 2A. A first terminal (port 1 shown in FIG. 2A) of the second fiber optic coupler is connected to the first fiber optic coupler, and the polarizing optical fiber is connected between a second terminal (port 2 shown in FIG. 2A) and a third terminal (port 3 shown in FIG. 2A) of the second fiber optic coupler.

Figure 2B:
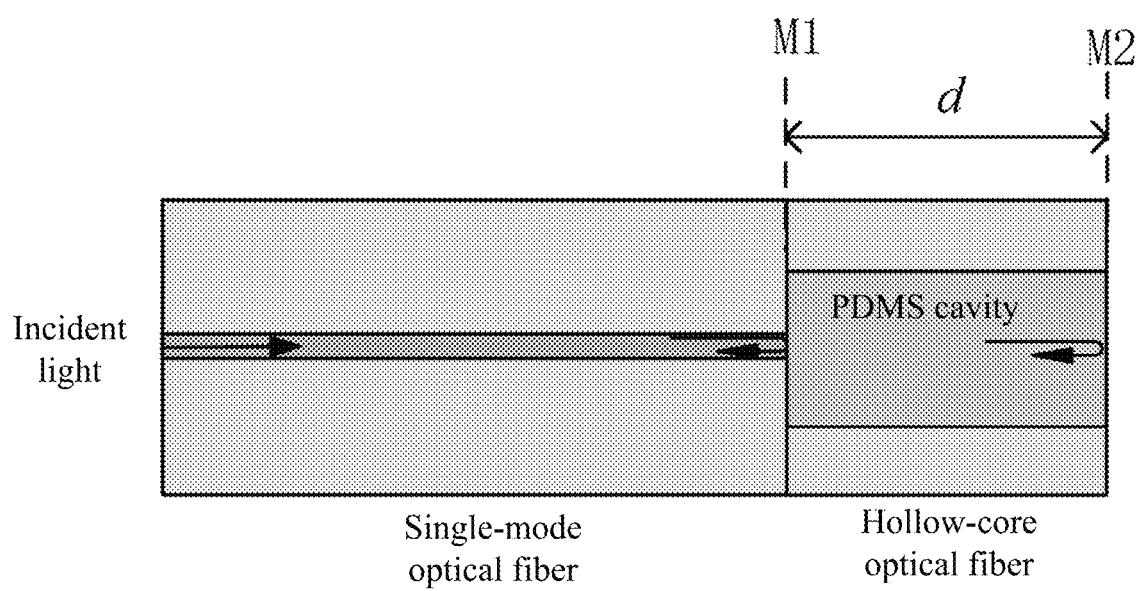
FIG. 2B is a schematic structural diagram illustrating an F-P interferometer formed by connecting a single-mode optical fiber and a PDMS cavity used in one embodiment of the present disclosure.

In addition, the second sensing interferometer may be, for example, an F-P interferometer formed by connecting a single-mode optical fiber and a PDMS cavity, as shown in FIG. 2B. The PDMS cavity is filled with PDMS.

As an example, the PDMS cavity may be, for example, a PDMS-filled quartz tube or a PDMS-filled hollow-core optical fiber.

The single-mode optical fiber is provided with one end for introducing incident light (may be connected to an attenuator) and the other end welded to one end of the quartz tube or hollow-core optical fiber, so that the introduced incident light can be reflected and transmitted at an interface between the single-mode optical fiber and the PDMS cavity of the hollow-core optical fiber.

Figure 3:
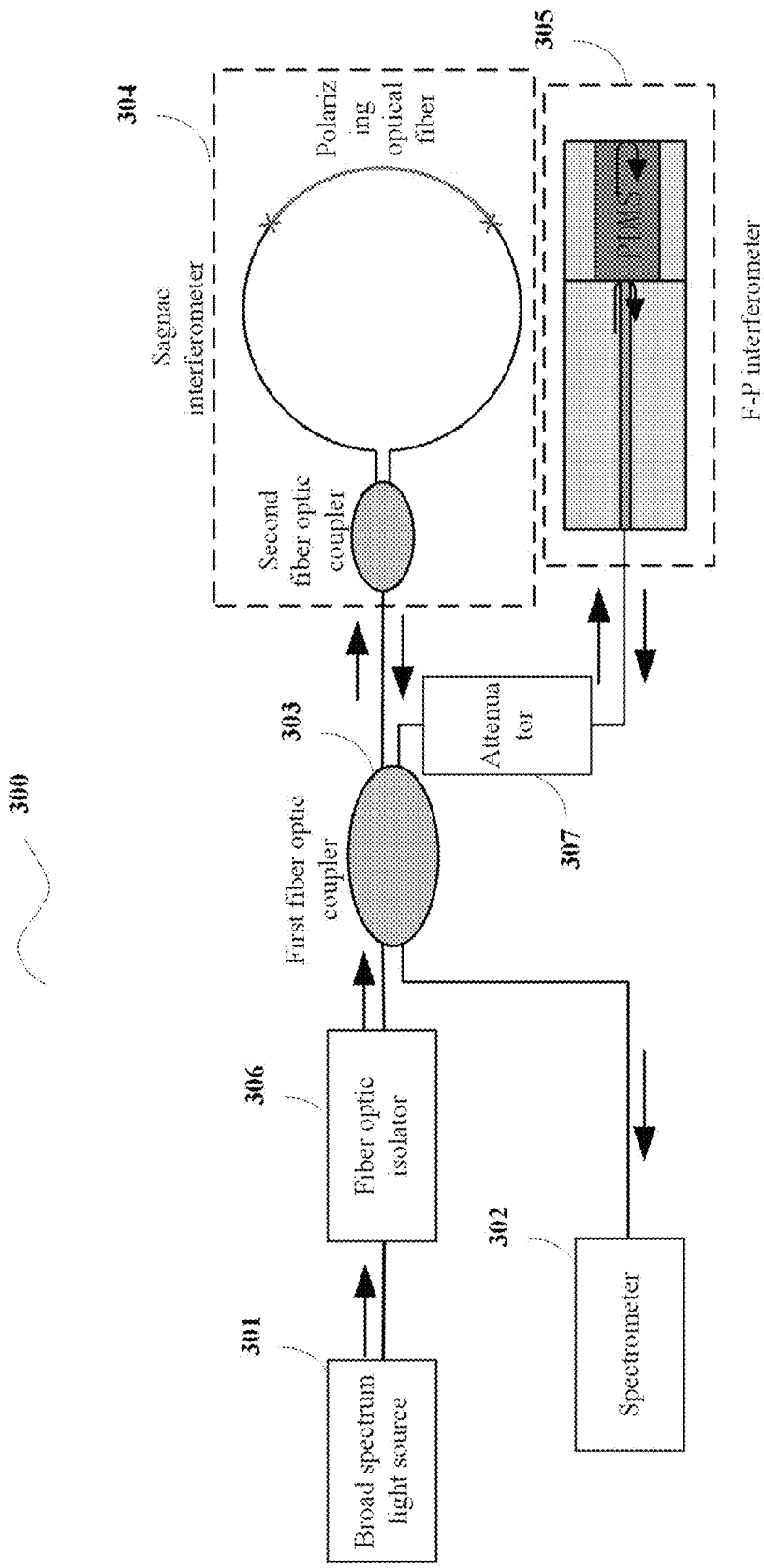
FIG. 3 is a schematic structure diagram illustrating another example of a fiber optic temperature sensor according to one embodiment of the present disclosure.

FIG. 3 is a schematic diagram of another possible structure of a fiber optic temperature sensor according to one embodiment of the present disclosure, In FIG. 3, a broad spectrum light source 301, a spectrometer 302, and a first fiber optic coupler 303 included in a fiber optic temperature sensor 300 may respectively have the same structures as the broad spectrum light source 101, the spectrometer 102, and the first fiber optic coupler 103 shown in FIG. 1, and can achieve similar functions. Therefore, details are not described herein again.

As shown in FIG. 3, in addition to the broad spectrum light source 301, the spectrometer 302, and the first fiber optic coupler 303, the fiber optic temperature sensor 300 further includes a fiber optic isolator 306 and an attenuator 307.

Incident light outputted by the broad spectrum light source 301 is divided into two paths after successively passing through the fiber optic isolator 306 and the first fiber optic coupler 303, where one path enters a Sagnac interferometer 304, and the other path enters an F-P interferometer 305 through the attenuator 307. In this way, a result of superimposing an interference spectrum returned by the Sagnac interferometer 304 and an interference spectrum returned by the F-P interferometer 305 (superimposition spectrum) can be obtained by the spectrometer 302.

The incident light entering the Sagnac interferometer 304 is divided in the polarizing optical fiber into two light beams having polarization directions perpendicular to each other, interference occurs between the two light beams after passing through the polarizing optical fiber, and obtained interference light is outputted from the first terminal of the second fiber optic coupler and then received by the spectrometer 302 through the first fiber optic coupler 303.

In a Sagnac ring, due to different refractive indexes of the two polarization directions, the two light beams in the different polarization directions have different phases after passing through the polarizing optical fiber, thereby producing interference, and obtaining the interference light.

In addition, the incident light entering the F-P interferometer 305 first enters the single-mode optical fiber, where a part of the incident light is reflected (reflected back to the single-mode optical fiber) at an interface M1 of the single-mode optical fiber and the PDMS cavity (as shown in FIG. 2B), and another part of the incident light passes through the interface M1.

Another part of the incident light passing through the interface M1 enters the PDMS cavity and is reflected back to the single-mode optical fiber at an interface of the PDMS cavity and air (the part of the incident light reflected at the interface of the PDMS cavity and the air is first returned to the PDMS cavity, passes through the PDMS cavity and the interface M1 successively, and enters the single-mode optical fiber), and then is interfered with the part of the incident light reflected to the single-mode optical fiber at the interface M1 of the single-mode optical fiber and the PDMS cavity.

A length l of the polarizing optical fiber (a first predetermined length as described below) and an axial length d of the PDMS cavity (a second predetermined length as described below) are set as: making the first free spectral range of the Sagnac interferometer close to but not equal to the second free spectral range of the F-P interferometer.

For example, the length l of the polarizing optical fiber and the axial length d of the PDMS cavity can be adjusted many times through experiments, so that the first free spectral range of the Sagnac interferometer related to the length l of the polarizing optical fiber and the second free spectral range of the F-P interferometer related to the axial length d of the PDMS cavity are close but not equal.

As an example, the fiber optic temperature sensor has a temperature sensitivity $S_{12}$ as shown in formula I.

Formula I:

$$S_{12} = M(S_2 - S_1) = \begin{cases} M_1' S_1 \\ M_2' S_2 \end{cases}.$$

$$\text{Where} \begin{cases} |M_1'| = \left|\left[1 - \dfrac{B(\alpha + n\beta)}{\Delta B}\right]M\right| > |M| \\ |M_2'| = \left|\left[1 - \dfrac{\Delta B}{B(\alpha + n\beta)}\right]M\right| > |M| \end{cases}.$$

M is an amplification factor of a conventional vernier effect.

$S_1$ represents a temperature sensitivity of the Sagnac interferometer, where $$S_1 = \frac{\Delta B}{B},$$

B represents a birefringence coefficient, $\Delta B$ represents a change in refractive index of the polarizing optical fiber when the temperature increases by 1° C., and $\Delta B < 0$.

$S_2$ represents a temperature sensitivity of the F-P interferometer, where $$S_2 = \frac{\lambda_m}{n}(\alpha + n\beta),$$

α represents a thermo-optical coefficient of PDMS, $\lambda_m$ represents a peak wavelength of an interference spectrum, n represents a refractive index of the PDMS, and β is a thermal expansion coefficient of the PDMS.

In this way, through a high-sensitivity temperature sensor that cascades a fiber optic Sagnac ring (Sagnac interferometer) and a fiber optic PDMS cavity (Fabry-Perot interferometer), the free spectral range of the optical fiber Sagnac ring and the free spectral range of the optical fiber PDMS cavity in the sensor are close but not equal, thereby producing a vernier effect to improve the sensitivity of temperature measurement. The produced vernier effect is different from the conventional vernier effect, and the conventional vernier effect requiresa reference interferometer (not sensitive to measured parameters) and a sensing interferometer (sensitive to external parameters)in cascade. However, the two interferometers in the sensor of this embodiment are both sensing interferometers, and the two interferometers have opposite temperature responses, thereby achieving anenhanced vernier effectand further improvingthe sensitivity of temperature measurement.

Example Device 2

According to one embodiment of the present disclosure, a sensing head structure for a fiber optic temperature sensor is also provided. The sensing head structure includes a first sensing interferometer and a second sensing interferometer. The first sensing interferometer and the second sensing interferometer have opposite temperature responses; and a first free spectral range corresponding to the first sensing interferometer is close to but not equal to a second free spectral range corresponding to the second sensing interferometer.

The sensing head structure according to this embodiment includes a first sensing interferometer and a second sensing interferometer, where the first sensing interferometer and the second sensing interferometer have opposite temperature responses.

A first free spectral range corresponding to the first sensing interferometer is close to but not equal to a second free spectral range corresponding to the second sensing interferometer.

As an example, as shown in FIG. 2A, the first sensing interferometer includes, for example, a Sagnac interferometer including a second fiber optic coupler and a polarizing optical fiber; and as shown in FIG. 2B, the second sensing interferometer includes an F-P interferometer formed by connecting a single-mode optical fiber and a PDMS cavity.

The PDMS cavity may be, for example, a PDMS-filled quartz tube or a PDMS-filled hollow-core optical fiber.

As an example, a result of superimposing an interference spectrum returned by the Sagnac interferometer and an interference spectrum returned by the F-P interferometer is obtained by a spectrometer of the fiber optic temperature sensor.

A first terminal of the second fiber optic coupler is connected to a first fiber optic coupler of the fiber optic temperature sensor, and the polarizing optical fiber is connected between a second terminal and a third terminal of the second fiber optic coupler.

A length of the polarizing optical fiber and an axial length of the PDMS cavity are set as: making the first free spectral range of the Sagnac interferometer close to but not equal to the second free spectral range of the F-P interferometer.

For example, the single-mode optical fiber is provided with one end connected to an attenuator and the other end welded to one end of a quartz tube or hollow-core optical fiber.

The first free spectral range is close to but not equal to the second free spectral range, specifically: a ratio of a difference between the first free spectral range and the second free spectral range to a union of the first free spectral range and the second free spectral range is greater than a first preset value and less than a second preset value.

As an example, the first preset value is, for example, 1%, and the second preset value is, for example, 10%.

It should be noted that the sensing head structure in this embodiment may have the same function as a corresponding structure in a light temperature sensor in the exemplary device 1 described above, and can achieve a similar effect. Therefore, details are not described herein again.

Exemplary Method

According to one embodiment of the present disclosure, a manufacturing method for a sensing head structure of a temperature sensor based on cascading of an optical fiber Sagnac interferometer and an F-P interferometer is also provided. The manufacturing method includes: taking a section of polarizing optical fiber having a length as a first predetermined length; connecting a second terminal of a second fiber optic coupler to one end of the section of polarizing optical fiber, and connecting a third terminal of the second fiber optic coupler to the other end of the section of polarizing optical fiber, so that the second fiber optic coupler and the polarizing optical fiber connected to each other form a Sagnac interferometer; welding one end of a single-mode optical fiber to one end of a PDMS cavity, the PDMS cavity being a hollow-core optical fiber or quartz tube; cutting the other end of the PDMS cavity, so that a length of the cut hollow-core optical fiber or quartz tube is a second predetermined length; and fully injecting PDMS into a cavity of the hollow-core optical fiber or quartz tube, and making the injected PDMS have no bubble inside, then heating to cure the injected PDMS to form the F-P interferometer, where the first predetermined length and the second predetermined length satisfy: making a first free spectral range of the Sagnac interferometer close to but not equal to a second free spectral range of the F-P interferometer.

One embodiment of the manufacturing method is described below.

In this embodiment, two manufacturing sub-processes are included, namely a manufacturing sub-process for the Sagnac interferometer and a manufacturing sub-process for the F-P interferometer.

It should be understood that the two sub-processes are not limited to be executed in the order described below, and may also be exchanged or executed in parallel.

In the manufacturing sub-process for the Sagnac interferometer, a section of polarizing optical fiber having a length as a first predetermined length is taken, the second terminal of the second fiber optic coupler is connected to one end of the section of polarizing optical fiber, and the third terminal of the second fiber optic coupler is connected to the other end of the section of polarizing optical fiber, so that the second fiber optic coupler and the polarizing optical fiber connected to each other form the Sagnac interferometer.

In the manufacturing sub-process for the F-P interferometer, one end of the single-mode optical fiber is welded to one end of the hollow-core optical fiber or quartz tube. Then, the other end of the hollow-core optical fiber or quartz tube is cut, so that a length of the cut hollow-core optical fiber or quartz tube is a second predetermined length. Next, PDMS is fully injected into the cavity of the hollow-core optical fiber or quartz tube, the injected PDMS has no bubble inside, and then heating is performed to cure the injected PDMS to form the F-P interferometer.

The first predetermined length and the second predetermined length satisfy: making the first free spectral range of the Sagnac interferometer close to but not equal to the second free spectral range of the F-P interferometer.

The first free spectral range is close to but not equal to the second free spectral range, specifically, for example: a ratio of a difference between the first free spectral range and the second free spectral range to a union of the first free spectral range and the second free spectral range is greater than a first preset value and less than a second preset value.

As an example, the first preset value is, for example, 1%, and the second preset value is, for example, 10%.

Preferred Embodiment

The sensor structure, as shown in FIG. 3, includes a broad spectrum light source (1200-1600 nm), a fiber optic isolator, a first fiber optic coupler, a fiber optic attenuator (i.e., the attenuator in the figure), a Sagnac ring (i.e., 304 in the figure), a PDMS cavity F-P interferometer (i.e., 305 in the figure), and a spectrometer.

The Sagnac ring is formed by respectively connecting two ports of a second fiber optic coupler to the two ends of a polarizing optical fiber having a length of L. The PDMS cavity is formed by welding a section of quartz tube or hollow-core optical fiber to the single-mode optical fiber and then filling PDMS in the quartz tube or hollow-core optical fiber.

Each of the single-mode optical fiber and the polarizing optical fiber has a diameter of, for example, 125 microns, and each of fiber cores has a diameter of, for example, 8-10 microns. The hollow-core optical fiber has an outer diameter of, for example, 125 microns, and an inner diameter of, for example, 50-70 microns.

The sensing head part includes two sensing heads. The manufacturing process of the Sagnac ring is as shown in FIG. 2A: the two ends 2 and 3 of the second fiber optic coupler are respectively connected to the two ends of the polarizing optical fiber having a length of L to form the Sagnac ring. The length L of the polarizing optical fiber ensures that a free spectral range of the Sagnac ring is close to but not equal to a free spectral range of the PDMS cavity.

The manufacturing process of the other sensing head is as shown in FIG. 2B: the single-mode optical fiber is welded to the hollow-core optical fiber, the hollow-core optical fiber is cut, the length of the cut hollow core is d, ensuring that the free spectral range of the PDMS cavity is close to but not equal to the free spectral range of the Sagnac ring; the PDMS is fully injected into the hollow-core optical fiber, ensuring that there is no bubble inside; and then heating is performed to cure the PDMS to form the PDMS cavity.

In this preferred embodiment, in the manufacturing process of the sensing heads, the sensing head containing the PDMS cavity can be manufactured first, and then the sensing head corresponding to the Sagnac ring is manufactured.

In this way, the length range of d is determined first, for example, d takes a value in the range of [100 um, 300 um]. The selection of d cannot be too long, otherwise, the light loss will be too large, and it is difficult to interfere.

After the single-mode optical fiber and the hollow-core optical fiber are welded, and the hollow-core optical fiber having a length of d is cut, the PDMS is injected according to the method described above, and the PDMS cavity is formed after curing. In this way, d is determined, that is, the free spectral range of the PDMS cavity is determined.

Next, after d is determined, an appropriate value of L is selected, so that the free spectral range of the manufactured Sagnac ring is close to but not equal to the free spectral range of the PDMS. For example, one of the two free spectral ranges covers the other spectral range, and one spectral range is 1.01-1.10 times or 0.90-0.99 times the other spectral range. For example, in this example, L may be 1 m. It should be understood that the value of L is not limited to the value mentioned in the above example. According to the previously determined d, the actual value of L is determined by satisfying such a condition that "the free spectral range of the Sagnac ring is close to but not equal to the free spectral range of the PDMS".

Light beam transmission process and sensing principle:

As shown in FIG. 3, incident light emitted by the broad spectrum light source is divided into two paths after successively passing through the fiber optic isolator and the first fiber optic coupler, one path enters the Sagnac ring, and the other path enters the PDMS cavity F-P interferometer through the attenuator. The incident light entering the Sagnac ring is divided in the polarizing optical fiber into two light beams having polarization directions perpendicular to each other. Since refractive indexes in the two polarization directions are different, interference occurs between the two light beams having two polarization components with a phase difference after passing through the polarizing optical fiber, and interference light is outputted from a first terminal of the second fiber optic coupler and then received by the spectrometer through the first fiber optic coupler.

The incident light entering the PDMS cavity F-P interferometer is at an interface M1, a part of the incident light is reflected back to the single-mode optical fiber, another part of the incident light is transmitted to enter the PDMS cavity, and the part of the incident light is reflected back to the single-mode optical fiber by an interface M2.

The interference spectrum of the Sagnac ring and the interference spectrum of the PDMS cavity can be expressed as $$\begin{cases} I_1(\lambda) = A_1\left[1 - \cos\left(\frac{2\pi BL}{\lambda}\right)\right] \\ I_2(\lambda) = A_2\cos\left(\frac{4\pi nd}{\lambda}\right) \end{cases} \quad (1)$$

Where $\lambda$ is a wavelength of the incident light, $I_1(\lambda)$ represents an intensity of the interference spectrum of the Sagnac ring, and $I_2(\lambda)$ represents an intensity of the interference spectrum of the PDMS cavity F-P interferometer. $A_1$ represents an amplitude of the interference spectrum of the Sagnac ring, and $A_2$ represents an amplitude of the interference spectrum of the PDMS cavity F-P interferometer. n is a refractive index of the PDMS, with a value of about 1.40; and B is a birefringence coefficient, with a value of $3\times10^{-4}$. The Sagnac ring and the PDMS cavity F-P interferometer form a parallel structure, and a spectrum received by the spectrometer is the superimposition of the Sagnac ring and the PDMS cavity F-P interferometer. When the free spectral range FSR1 of the Sagnac ring is close to but not equal to the free spectral range FSR2 of the PDMS cavity F-P interferometer, the interference spectra of the parallel double cavities produce an envelope.

Figure 4A:
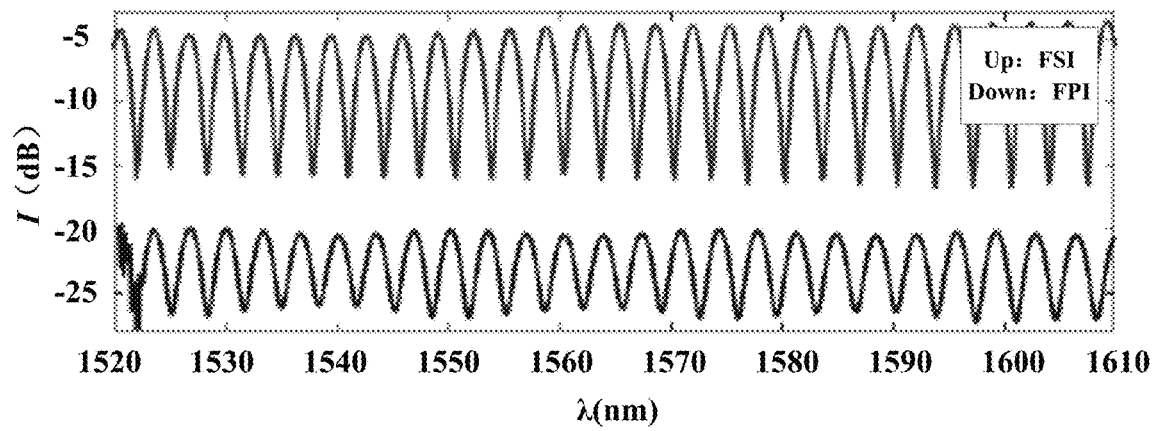
FIG. 4A is a schematic diagram illustrating respective interference spectra of a Sagnac interferometer and an F-P interferometer used in one embodiment of the present disclosure.

FIG. 4A is a schematic diagram illustrating an interference spectrum of a Sagnac interferometer and an interference spectrum of an F-P interferometer. The ordinate represents a light intensity, the abscissa represents a wavelength, FSI represents the Sagnac interferometer, and FPI represents the F-P interferometer.

The envelope described above refers to FIG. 4B.

Figure 4B:
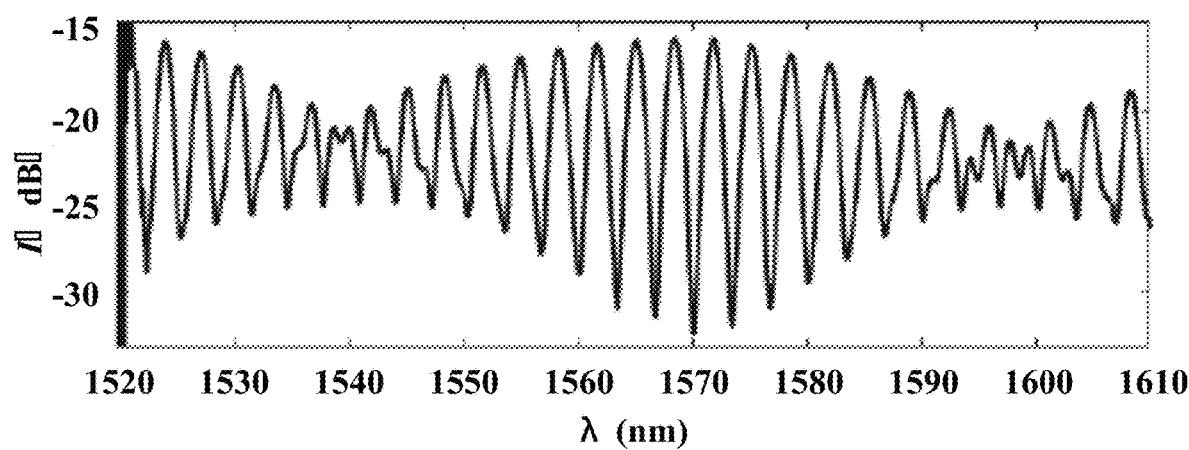
FIG. 4B is a schematic diagram illustrating parallel interference spectra of a Sagnac interferometer and an F-P interferometer used in one embodiment of the present disclosure.

As shown in FIG. 4B, the envelope may be represented as $$\begin{cases} I_{envelope}(\lambda) = E\cos\left(\dfrac{4\pi nd}{M\lambda}\right) \\ |M| = \left|\dfrac{BL}{BL - 2nd}\right| \end{cases} \quad (2)$$

Where $I_{envelope}(\lambda)$ represents a spectral intensity of the interference spectrum envelope, E represents an amplitude of the interference spectrum envelope, and M represents an amplification factor of the conventional vernier effect.

When the temperature changes, the birefringence coefficient of the polarizing optical fiber in the Sagnac ring changes. Therefore, the temperature sensitivity $S_1$ of the Sagnac ring may be expressed as $$S_1 = \dfrac{d\lambda_m}{dT} = \dfrac{\Delta B}{B} \quad (3)$$

Where $\Delta B$ represents a change in refractive index of the polarizing optical fiber when the temperature increases by 1° C., and $\Delta B < 0$.

$$\dfrac{d\lambda_m}{dT}$$

represents a rate of change of a peak wavelength of the interference spectrum with temperature.

When the temperature changes, both the cavity length and the refractive index of the PDMS cavity change. Therefore, the temperature sensitivity $S_2$ of the PDMS cavity may be expressed as $$S_2 = \dfrac{d\lambda_m}{dT} = \dfrac{\lambda_m}{n}(\alpha + n\beta) \quad (4)$$

Where $\alpha$ represents a thermo-optical coefficient of the PDMS, and $\lambda_m$ represents a peak wavelength of the interference spectrum. $\beta$ represents a thermal expansion coefficient of the PDMS, with a value of about $9.6 \times 10^{-4}/°$ C.

It can be known from formula (3) and formula (4) that $S_1 < 0$ and $S_2 > 0$, which are positive values. That is, when the temperature changes, the interference spectrum of the Sagnac ring and the interference spectrum of the PDMS cavity have opposite frequency shift directions. When the free spectral range of the Sagnac ring is close to but not equal to the free spectral range of the PDMS cavity, the interference spectra will produce an envelope after parallel connection, an amount of translation of the interference spectrum envelope with temperature will be much greater than that of a single Sagnac ring and a single PDMS cavity, and the sensitivity $S_{12}$ is $$S_{12} = M(S_2 - S_1) = \begin{cases} M_1' S_1 \\ M_2' S_2 \end{cases} \quad (5)$$

$$\begin{cases} |M_1'| = \left|\left[1 - \dfrac{B(\alpha + n\beta)}{\Delta B}\right]M\right| > |M| \\ |M_2'| = \left|\left[1 - \dfrac{\Delta B}{B(\alpha + n\beta)}\right]M\right| > |M| \end{cases} \quad (6)$$

It can be known from formula (5) and formula (6) that the temperature sensor provided in this embodiment achieves the enhanced vernier effect, the temperature sensitivity is higher than the sensitivity of the single Sagnac ring and the sensitivity of the single PDMS cavity by $M_1'$ and $M_2'$, and magnifications $M_1'$ and $M_2'$ are both significantly greater than the magnification M of the conventional vernier effect.

Compared with the patent application No. 201810971799.7 in the prior art, the present disclosure has the following same point, differences and advantages: (1) same point: the sensitivity of the sensor is improved by using a vernier effect technology; difference 1: the specific structures are different, the prior art of 201810971799.7 uses a double-cavity serial structure, while this embodiment uses a parallel structure of the Sagnac ring and the PDMS cavity; the prior art of 201810971799.7 does not use a PDMS material for sensitization, while this embodiment uses PDMS for sensitization; there are two F-P cavities in the prior art of 201810971799.7, one is a sensor, and the other one is a reference cavity, while the Sagnac ring and the PDMS cavity in this embodiment are both sensors, the achieved vernier effect is enhanced, and therefore, under the same structural parameters, the sensitivity amplification of the present disclosure is much higher than that of the above patent.

In addition, compared with the patent application No. 201810738431.6 in the prior art, the present disclosure has the following differences and advantages: the prior art of 201810738431.6 uses plating and gluing for manufacturing an optical fiber micro-cavity, the manufacturing process is complex, the plating requires an expensive plating equipment, a longer time is consumed, and the gluing makes the stability of the sensor become weak; while the present disclosure uses optical fiber welding for manufacturing the optical fiber micro-cavity, the operation is simple, and no expensive equipment is required.

In conclusion, this embodiment has the following advantages: 1) only the manufacturing method of optical fiber welding is used, so that the manufacturing is simple, and a special expensive equipment is not required; 2) gluing is not required, so that the stability of the sensor is good; 3) parallel connection of double cavities can produce a vernier effect to improve the sensitivity, and the extinction ratio of interference spectrum envelope is adjustable; and 4) the enhanced vernier effect is produced, and the sensitivity magnification is higher.

It should be noted that although several units, modules, or sub-modules of the system are mentioned in the above detailed description, this division is merely illustrative but not limiting. Indeed, the features and functions of the two or more modules described above may be embodied in one module according to implementations of the present disclosure. Conversely, the features and functions of one module described above may be further divided to be embodied by the multiple modules.

In addition, although the operations of the method in the present disclosure are described in the drawings in a particular sequence, it is not required or implied that the operations must be performed in that particular sequence or that all of the operations shown must be performed to achieve the desired results. Additionally or alternatively, some steps may be omitted, a plurality of steps may be combined into a single step for execution, and/or a single step may be divided into a plurality of steps for execution.

Although the spirit and principles of the present disclosure have been described with reference to several specific embodiments, it should be understood that the present disclosure is not limited to the specific implementations disclosed, nor does the division of aspects imply that features of these aspects cannot be combined to perform benefit, this division is only for convenience in description. The present disclosure is intended to cover all such modifications and equivalent arrangements that fall within the spirit and scope of the appended claims.

What is claimed is:

1. A fiber optic temperature sensor, comprising:
a broad spectrum light source,
a first fiber optic coupler,
a spectrometer,
a first sensing interferometer, and
a second sensing interferometer;
wherein the first sensing interferometer and the second sensing interferometer have opposite temperature responses;
wherein a first free spectral range corresponding to the first sensing interferometer is not equal to a second free spectral range corresponding to the second sensing interferometer;
the first sensing interferometer is configured to be a Sagnac interferometer comprising a second fiber optic coupler and a polarizing optical fiber, and the second sensing interferometer is configured to be an F-P interferometer formed by connecting a single-mode optical fiber and a polydimethylsiloxane (PDMS) cavity; and
the fiber optic temperature sensor has a temperature sensitivity $S_{12}$ as follows:

$$S_{12} = M(S_2 - S_1) = \begin{cases} M_1'S_1 \\ M_2'S_2 \end{cases};$$

wherein $\begin{cases} |M_1'| = \left|\left[1 - \frac{B(\alpha + n\beta)}{\Delta B}\right]M\right| > |M| \\ |M_2'| = \left|\left[1 - \frac{\Delta B}{B(\alpha + n\beta)}\right]M\right| > |M| \end{cases};$ M is an amplification factor of a conventional vernier effect;
$S_1$ represents a temperature sensitivity of the Sagnac interferometer, wherein $$S_1 = \frac{\Delta B}{B},$$

B represents a birefringence coefficient, $\Delta B$ represents a change in a refractive index of the polarizing optical fiber when temperature increases by 1° C., and $\Delta B < 0$;

$S_2$ represents a temperature sensitivity of the F-P interferometer, wherein $$S_2 = \frac{\lambda_m}{n}(\alpha + n\beta),$$

$\alpha$ represents a thermo-optical coefficient of PDMS, $\lambda_m$ represents a peak wavelength of an interference spectrum, n represents a refractive index of the PDMS, and $\beta$ is a thermal expansion coefficient of the PDMS;

the fiber optic temperature sensor further comprises a fiber optic isolator and an attenuator;
an incident light outputted by the broad spectrum light source is divided into two paths after successively passing through the fiber optic isolator and the first fiber optic coupler, wherein one path enters the Sagnac interferometer, and the other path enters the F-P interferometer through the attenuator; a result of superimposing an interference spectrum returned by the Sagnac interferometer and an interference spectrum returned by the F-P interferometer is obtained by the spectrometer;
a first terminal of the second fiber optic coupler is connected to the first fiber optic coupler; the polarizing optical fiber is connected between a second terminal and a third terminal of the second fiber optic coupler; the incident light entering the Sagnac interferometer is divided in the polarizing optical fiber into two light beams having polarization directions perpendicular to each other, an interference occurs between the two light beams after passing through the polarizing optical fiber, and an obtained interference light is outputted from the first terminal of the second fiber optic coupler and then received by the spectrometer through the first fiber optic coupler;
a part of the incident light entering the F-P interferometer is reflected back to the single-mode optical fiber at an interface between the single-mode optical fiber and the PDMS cavity, and another part of the incident light is transmitted to enter the PDMS cavity and then partially reflected back to the single-mode optical fiber at an interface between the PDMS cavity and air, and is interfered with the part of the incident light reflected back to the single-mode optical fiber at the interface between the single-mode optical fiber and the PDMS cavity; and
wherein a length of the polarizing optical fiber and an axial length of the PDMS cavity are configured to make the first free spectral range of the Sagnac interferometer not equal to the second free spectral range of the F-P interferometer.

2. The fiber optic temperature sensor according to claim 1, wherein the first free spectral range is not equal to the second free spectral range,
wherein a ratio of a difference between the first free spectral range and the second free spectral range to a union of the first free spectral range and the second free spectral range is greater than a first preset value of 1% and less than a second preset value of 10%.

* * * * *